(12) United States Patent
Weinberg et al.

(10) Patent No.: US 9,674,536 B2
(45) Date of Patent: Jun. 6, 2017

(54) TECHNIQUE FOR VISUALIZING ELEMENTS IN IMAGES BY COLOR CODING

(71) Applicant: Applied Materials Israel Ltd., Rehovot (IL)

(72) Inventors: Yakov Weinberg, Modi'in (IL); Hagai Kirshner, Kfar Saba (IL); Ishai Schwarzband, Or-Yehuda (IL)

(73) Assignee: Applied Materials Israel, Ltd., Rehovot (IL)

( * ) Notice: Subject to any disclaimer, the term of this patent is extended or adjusted under 35 U.S.C. 154(b) by 0 days.

(21) Appl. No.: 14/937,609

(22) Filed: Nov. 10, 2015

(65) Prior Publication Data

US 2017/0134735 A1  May 11, 2017

(51) Int. Cl.
G06K 9/34 (2006.01)
H04N 19/186 (2014.01)
G06T 7/00 (2017.01)
H04N 19/17 (2014.01)

(52) U.S. Cl.
CPC ......... *H04N 19/186* (2014.11); *G06T 7/0079* (2013.01); *H04N 19/17* (2014.11); *G06T 2207/10004* (2013.01); *G06T 2207/10024* (2013.01)

(58) Field of Classification Search
CPC . G06T 2207/30148; G06T 2207/10056; G06T 2207/10061; G06T 7/0004; G06K 2209/19; G06K 2209/403
See application file for complete search history.

(56) References Cited

U.S. PATENT DOCUMENTS

| 6,201,240 | B1 | 3/2001 | Dotan et al. |
| 6,456,899 | B1* | 9/2002 | Gleason et al. ...... G03F 7/7065 700/110 |
| 2011/0222765 | A1 | 9/2011 | Oicherman et al. |
| 2014/0198979 | A1* | 7/2014 | Hamarneh et al. ...... A61B 6/03 382/154 |

OTHER PUBLICATIONS

Ahmed Al-Taie, Horst K. Hahn, Lars Linsen, "Uncertainty estimation and visualization in probabilistic segmentation", Computers & Graphics, vol. 39, Apr. 2014, pp. 48-59 http://www.sciencedirect.com/science/article/pii/S0097849313001532.

Potter, K.; Gerber, S.; Anderson, E.W., "Visualization of Uncertainty without a Mean,"Computer Graphics and Applications, IEEE , vol. 33, No. 1, pp. 75,79, Jan.-Feb. 2013 http://ieeexplore.ieee.org/stamp/stamp.jsp?tp=&arnumber=6415481&isnumber=6415473.

(Continued)

*Primary Examiner* — Eueng-Nan Yeh
(74) *Attorney, Agent, or Firm* — Lowenstein Sandler LLP (57) ABSTRACT

A technique for visualizing elements in images by applying a color coding procedure to data which comprises an initial image and segmentation results based on N labels. The segmentation results comprise information on segmentation uncertainty. The color coding procedure constructs a resulting colored image based on the initial image and N preselected base colors, and in such a manner that colors in the resulting colored image are modified by using intensity of the initial image and the information on segmentation uncertainty.

20 Claims, 5 Drawing Sheets

(56) References Cited

OTHER PUBLICATIONS

Kniss, J.M.; Van Uitert, R.; Stephens, A.; Li, G.-S.; Tasdizen, T.; Hansen, C., "Statistically Quantitative Volume Visualization," Visualization, 2005. VIS 05. IEEE , vol., No., pp. 287,294, Oct. 23-28, 2005 http://ieeexplore.ieee.org/stamp/stamp.jsp?tp=&arnumber=1532807&isnumber=32702.

Griethe H.,Schumann H., "Visualizing Uncertainty for Improved Decision Making", In Proceedings of International Conference on Perspectives in Business Informatics Research (Karlstad, Sweden, 2005), Skovde, Sweden. http://vcg.informatik.uni-rostock.de/~schunnann/papers/2004+/Uncertainty.pdf (published before this application Nov. 2015).

\* cited by examiner

TECHNIQUE FOR VISUALIZING ELEMENTS IN IMAGES BY COLOR CODING

FIELD OF THE INVENTION

The present invention relates to a technique for visualizing elements in images by applying color coding. In one specific example, the invention visualizes data on a complex structure, by associating different colors to elements/segments belonging to different areas or layers of such a structure. Still more specifically, the invention relates to visualization of segmentation results which may be obtained for images of modern integrated semiconductor circuits having multiple layers.

BACKGROUND OF THE INVENTION

Many technological fields deal with visualization of uncertain data on various objects. One, though a non-limiting example of such uncertain data is an image of a complex, multilayer physical object; indeed, a single image physically cannot comprise accurate information on all layers of the object. Structure of such objects may be studied by deeply analyzing available images thereof. Examples of the imaging and further analysis may be found in meteorology, in geophysics, biology, medicine, in medical equipment technologies such as Computer Tomography, in inspection of modern 3D semiconductor structures, etc. The images to be analyzed may be obtained by various technologies utilized in the corresponding fields.

In the present patent application, the technique of interest will be described, inter alia, by using a non-limiting example from the field of inspection of modern multilayer semiconductor structures.

The modern multilayer semiconductor structures of interest have arrived to such a scale of miniaturization (presently, up to nodes scale of about 7-10 nm) that they can hardly be inspected with required accuracy by optical microscopes which provide visual images.

An alternative, more practical option is to utilize technologies involving more advanced tools than optical microscopes. Scanning electron microscopes (SEM) are often used in inspection of semiconductor wafers in order to detect and classify defects in production of microelectronic devices. SEM images, however, contain a wealth of detail, which must be properly interpreted in order to identify the structures appearing in each image, to distinguish the structures from other features and to estimate their relative coordinates.

In order to proceed with the description, some comprehensive definitions have been introduced below, which are important for understanding the problem and the exemplary solutions which will be described below.

Three-dimensional integrated circuit (3D IC)—an integrated circuit manufactured by stacking silicon wafers and/or dies and interconnecting them vertically using through-silicon vias (TSVs) so that they behave as a single device. 3D IC is an example of a Multilayer structure.

SEM—Scanning Electron Microscope used for exposing a 3D IC to a primary electron beam, collecting data on responsive electron beams or scattering electrons from multiple layers of the 3D IC and further reconstructing a combined SEM image of the multiple layers by applying computer processing to the collected data.

Available (Initial) image—a digital image, or a set of digital images of an object to be analyzed, for example in the form of a grey scale image. SEM-image—one example of Available (Initial) image. Available image may be planar or three-dimensional.

Segmentation of available image—labeling pixels of the available image to associate them with two or more different classes of features (objects, elements). The features may be located at different layers of the object(s) to be analyzed. Image segmentation is typically used to locate objects and boundaries (lines, curves, etc.) in the images.

More precisely, image segmentation is a process of assigning a label to every pixel in an image, such that pixels with the same label share certain characteristics.

Segmentation of SEM-image—labeling pixels of a SEM-image of a group or system of objects by classes of features, wherein the features may be located at different objects/areas/portions/of the group, for example at different layers of that group of objects.

Various techniques are known in the art for automated segmentation of SEM images to assist in proper image interpretation thereof.

Segmentation results—comprise information 1 about labeling of each specific pixel of an Initial image, and information 2 about uncertainty of the labeling of each specific pixel, the information 2 being also called segmentation uncertainty or segmentation uncertainty measure.

Pixel—will be used to indicate a minimal portion/cell/unit of an image.

Methods of image segmentation have a wide range of applications, such as analysis of medical data, visualization of bio-informatics data, remote sensing studies, etc. Uncertainty arises from measurement inaccuracies and from predication errors, as in the case of image segmentation problems. Probabilistic approaches to image segmentation associate a vector of uncertainty values to each pixel. Each value in this vector describes the uncertainty of determining whether the pixel is a member of a specific segment or not. The visualization task is then carried out by assigning a unique color for each segment and by defining a mapping from the uncertainty vector values to specific color coordinates. In the volumetric case, opacity may be determined as well. Currently available color mappings are based on maximum probability (also known as tagged data), on probability thresholding; on probability ratios (risk values); and on entropy values. The uncertainty measure in these cases is used for choosing one of the colors for a segment and for setting either its intensity or saturation value. In such a case, the obtained/displayed image does not reflect pixel values of the initial image any more. Rather, it reflects the segmentation uncertainty only.

To the best of the Applicant's knowledge, there is still a long felt need for a simple and effective technique for visualization of elements in an available image.

SUMMARY OF THE INVENTION

It is therefore a purpose of the invention to provide a new, user-oriented method for visualizing data comprising segmentation results of various areas of an object, by performing color coding, suitable also for cases where the segmentation results have uncertainty.

The term "object" will be used to indicate a group of one or more objects of interest, areas (portions, elements) of which are to be visualized by the proposed technique.

The concept of the invention is to provide a technique (a method, a system and a software product) for visualizing elements in images by applying a color coding procedure to data which comprises an initial image, results of segmentation performed using N labels, wherein said segmentation results correspond to the initial image and comprise information on segmentation uncertainty, and wherein the color coding procedure comprises constructing a resulting colored image based on the initial image and N pre-selected base colors respectively assigned to the N labels, while modifying colors in the resulting colored image by using intensity of the initial image and the information on segmentation uncertainty.

The proposed visualization technique is advantageous since it is a hybrid technique that utilizes and combines properties of two different types of data: an initial (given, input) image and segmentation results.

In one version of the method, the initial image may be a SEM-image of a physical object which is a semiconductor multilayer structure, the image may be preliminarily produced by a SEM device. It should be made clear, however, that the proposed technique is applicable to other fields, other objects, and to other imaging approaches.

The results of segmentation (i.e., segmentation results) may be obtained from the initial image and/or from another source of information.

The segmentation results may include information on labeling of each specific pixel of the initial image, using said N labels, and the information on segmentation uncertainty (i.e., uncertainty of labeling) of each specific pixel of the initial image. The segmentation results may be presented in the form of an uncertainty vector V.

Color variations (modifications) in the resulting colored image may be performed by creating gradual changes of the base colors, so as to visibly, illustratively reflect the segmentation uncertainty, if exists. The nature of the color changes may depend on the type of color coding procedure, which will be described later.

The method of visualization may further comprise: determining intensity value of each pixel of the initial image (which value is actually given as an intrinsic property of the initial image), producing the resulting colored image by performing the color-coding procedure, in which color of any pixel of the resulting colored image is calculated using said N base colors, the information of segmentation uncertainty of the corresponding pixel of the initial image, (for example presented as an uncertainty vector V), and intensity value of the corresponding pixel in the initial image.

The color coding procedure may use two mathematical operators comprising a pixel-wise intensity operator I and a pixel-wise uncertainty operator U.

In one version of the color coding procedure, the operator I participates in calculating a color of a pixel of the resulting image, by using intensity of a corresponding pixel of the initial image, while the operator U participates in calculating a color of a pixel of the resulting image, using the segmentation results for a corresponding pixel of the initial image.

In a further version of the color coding procedure, the following steps may be taken: applying the operator I for modifying each of the selected N base colors according to intensity of the initial image, thereby creating N base color images of the initial image; applying the operator U to the N base color images for combining (fusing) the images according to the segmentation results, thereby obtaining the resulting colored image.

The color coding procedure may be performed using one or more color spaces.

The mathematical operator I may be applied in a color space called C(I).

The mathematical operator U may be applied in a color space called C(U).

The two color spaces C(I) and C(U) may be different, but may be equal.

The color-coding procedure may comprise applying the operator I in the color-space C(I) to the selected N base colors.

Examples of the color space C(I) are numerous: HSV, RGB, LAB etc. Some of them will be discussed in the detailed description.

It is understood, that the manner of applying the intensity operator I will depend on the kind of color space C(I).

The color-coding procedure may further comprise applying the uncertainty operator U in a color-space C(U) to the N base color images, to convert color coordinates of each pixel of the N base color images to color coordinates in the color space C(U). Examples of C(U) may also comprise HSV, LAB, RGB, etc. C(U) may be equal to or different from (CI). Examples: HSV and HSV again, RGB and Lab, etc.

The way of applying the pixel-wise uncertainty operator U to the N base color images will depend on the color space in which the base colors (or the base color images) are represented, and on the information comprised in the segmentation results (vector V) and naturally, on the operator U itself.

Upon applying the pixel-wise uncertainty operator U, the resulting color image may be obtained.

Still, the colors obtained after applying the operator U may be represented in yet another, representational color space. In that case the resulting color image may be displayed in said representational color space which differs from the C(U).

In one specific example, the method may comprise applying the intensity operator I in the color space HSV thus forming said N base color images by setting per-pixel attribute V (Value) at each of the N images according to per-pixel intensity in the initial image, applying the uncertainty operator U to the N base color images, wherein the operator U is applied per pixel in the color space HSV and takes into account the segmentation results indicating a label and a corresponding segmentation uncertainty value per pixel, provides a weighted sum of the N base color images, according to the indicated label, modifies the attribute S (Saturation), according to the indicated segmentation uncertainty.

In another specific example, the method may comprise applying the intensity operator I in the color space RGB thus forming said N base color images such, that in each of the N base color images, the values of the color attributes R,G B per pixel correspond to per-pixel intensity in the initial image, applying the uncertainty operator U to the N base color images in the color space Lab, wherein the operator U is applied per pixel by transforming the color coordinates of the N color images into coordinates of Lab, taking into account the segmentation results indicating more than one labels with corresponding segmentation uncertainty values per pixel, obtaining a weighted sum of the N base color images according to the segmentation uncertainty values.

The proposed method is advantageous in that the selected combination and order of the color spaces allow controlling both the quality and the illustrative character of the resulting image (which visualizes elements of the initial image).

According to a second aspect of the invention, there is also provided a system for visualizing elements in images by color coding, the system comprises a processor and a memory for storing and processing data including an initial image, results of segmentation related to the initial image, obtained based on N labels and comprising information on segmentation uncertainty, N pre-selected base colors respectively assigned to the N labels, wherein the processor and the memory accommodate at least one color coding software block designed for applying a color coding procedure to the data so as to construct a resulting colored image based on the initial image and the pre-selected N base colors, while modifying colors in the resulting colored image by using intensity of the initial image and the information on segmentation uncertainty.

The system may further comprise an imaging device (for example, a SEM, an optical microscope, an ultrasound device, a CT device, etc.) for obtaining initial image of the object, a software block for providing segmentation results, and/or an interface to allow controlling the color-coding software block by a user, for example by selecting various sets of N basic colors, various options of reading and processing the segmentation results, various options of mathematical operators I, U, and/or various color spaces for C(I), C(U), a representational color space.

It should be noted that the details and the options described above with reference to the inventive method, are also applicable to the inventive system.

According to a third aspect of the invention, there is further provided a software product comprising computer implementable instructions and/or data for carrying out the method described above, stored on an appropriate computer readable non-transitory storage medium so that the software is capable of enabling operations of said method when used in a computer system.

The invention will be described in more details as the description proceeds.

BRIEF DESCRIPTION OF THE DRAWINGS

The invention will be explained in more detail with the aid of the following non-limiting drawings in which:

FIG. 1 schematically illustrates an embodiment of the system adapted to perform the inventive method. In FIG. 1, the object is a semiconductor wafer, the initial (available, given) image is obtained by SEM and processed by a computer processor.

DETAILED DESCRIPTION OF PREFERRED EMBODIMENTS

Figure 1:
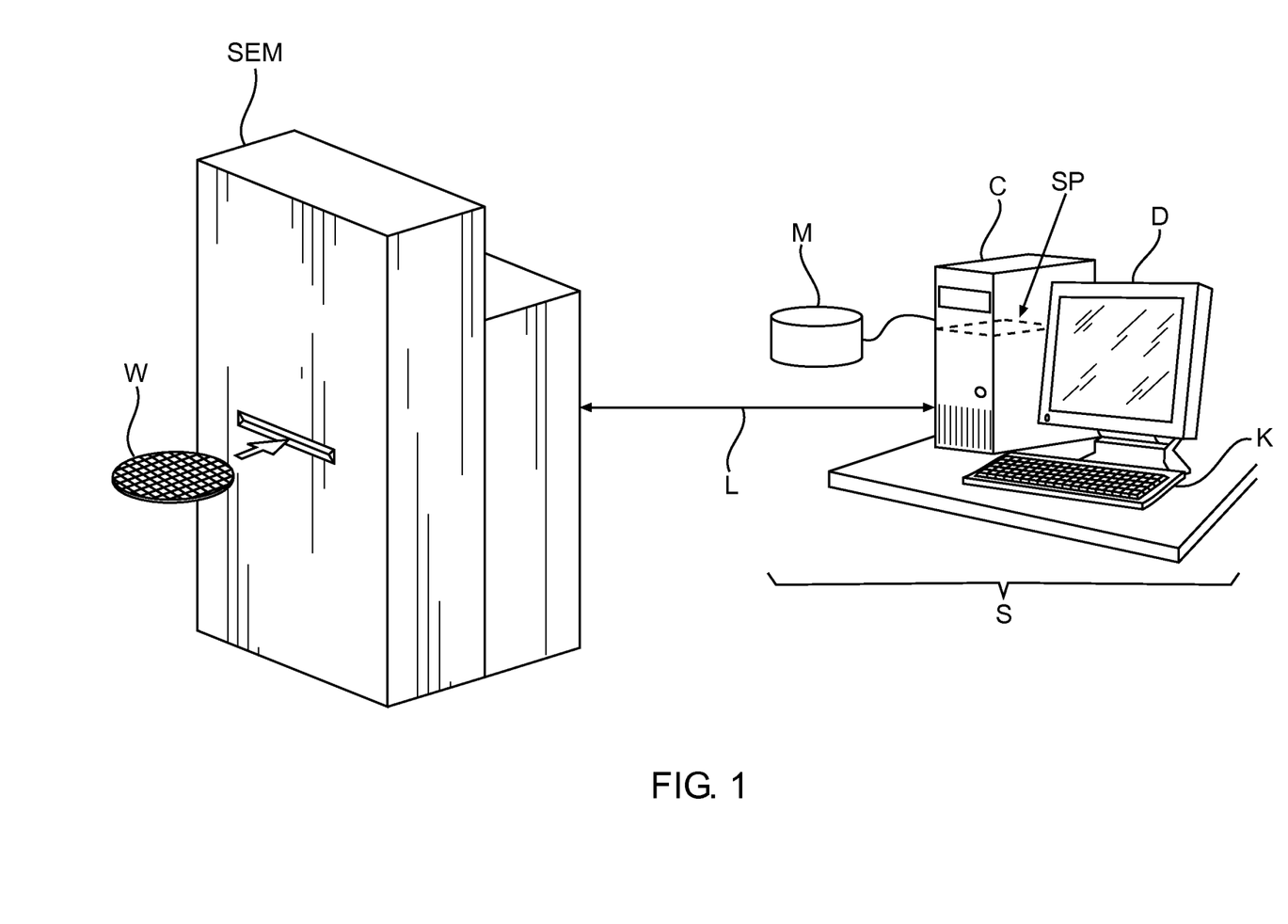

FIG. 1 is a pictorial presentation of an exemplary set of equipment for implementing one embodiment of a system S according to the invention. In the example shown in FIG. 1, the system S is intended for inspection of objects being multilayer semiconductor structures (3D IC, wafers W), using an electron scanning microscope SEM.

The system S comprises a computer C with the processor (not seen) and the memory which is shown schematically as an external block M. The computer accommodates a computer readable media with a software product SP (shown as a dotted contour) which is responsible for the inventive visualization process. The computer is also equipped with a display D and a keyboard K so that an operator may control and adjust the visualization process (i.e., to change the appearance of the resulting image), for example by selecting N specific base (or segment) colors, selecting the mathematical operators I, U, specific color spaces, etc. The computer C is in communication, via line L, with the electron scanning microscope SEM which is adapted to create an initial image of a three-dimensional multilayer structure (a semiconductor wafer W is shown).

The SEM-image (the initial image) obtained in the SEM is transmitted to the computer C, where it is processed and stored in the memory M.

Memory M of the computer C may also store a set of programs for obtaining segmentation results for the initial image, including data characterizing uncertainty of the segmentation. The software program/SP is designed for color-coding of the initial image in a manner visualizing the mentioned uncertainty and other input data.

As mentioned above, parameters of the software product may be adjusted by an operator, for example by selecting specific N base colors for N segmentation labels.

It should be mentioned here that an object (for example, W) may have K layers or segment types, but such segment types may be grouped so as to be presented/labeled by N (N≤K) labels (and then indicated by N base colors). For example, only an upper layer and the background may be of interest for an operator/user, and thus N will be equal 2.

It goes without saying that the computer software, including the product SP, comprises program means responsible for various functions of the system. Some of the functions will be described with reference to flowcharts illustrated in the following drawings.

Figure 2:
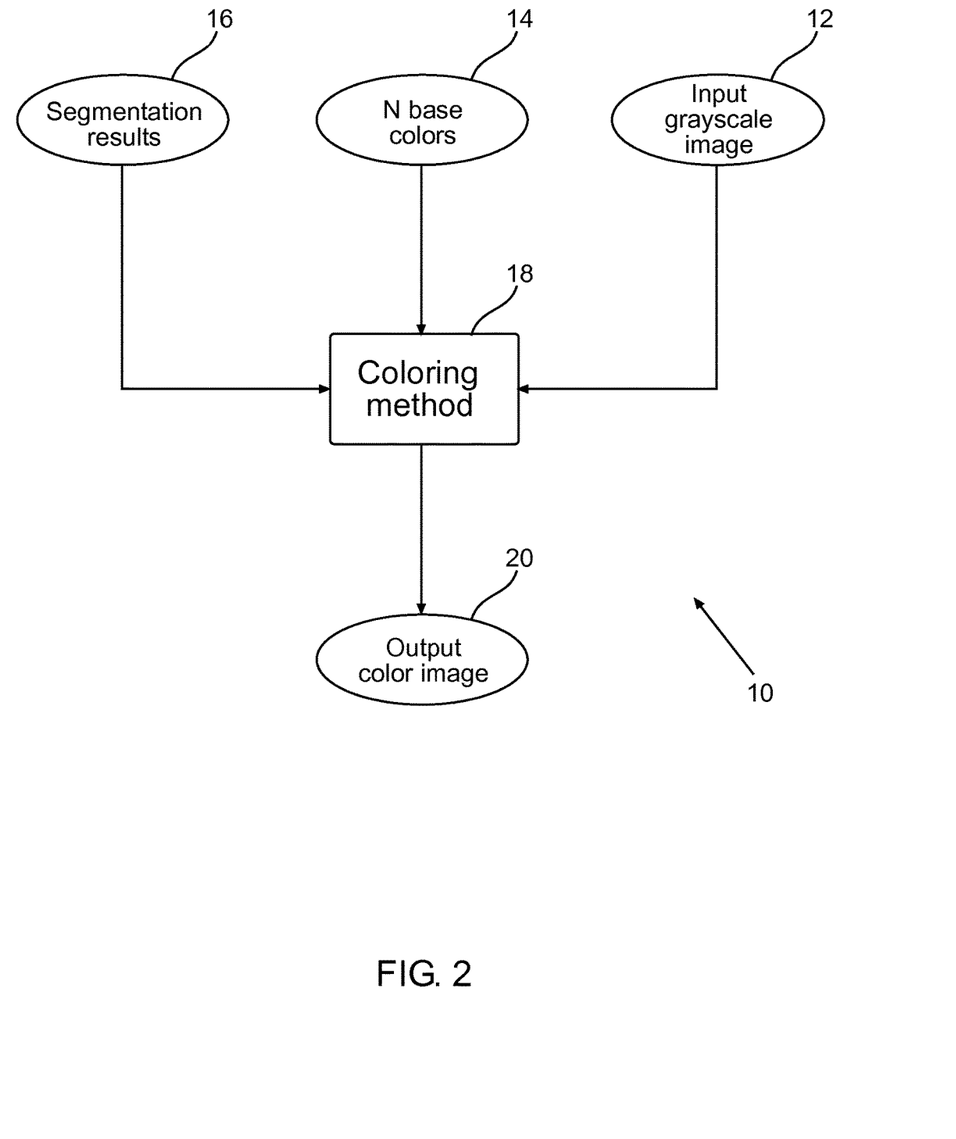
FIG. 2 illustrates a schematic flow chart of a generalized proposed method.

FIG. 2 shows a schematic flow chart 10 generally describing the proposed method.

The input data comprises data on a physical object and on its segmentation. More specifically, FIG. 2 shows the input data as: an initial image 12 (preferably a grey-scale image) of an object, N selected base (segment) colors 14 for labeling N types of elements of the object, and Segmentation Results 16 which comprise per-pixel information on labeling and on segmentation uncertainty of a specific pixel of the initial image. The segmentation results 16, for example, may be presented in the form of an uncertainty vector V.

By applying the proposed Coloring Method 18 (which is also called "color-coding procedure" in this description) to the input data 12, 14, 16, a resulting/output color image 20 is obtained. The image 20 visualizes the object by colors which are modified by using both the initial image and the segmentation results. Some more specified examples of the method will be discussed below with reference to FIGS. 3 to 5.

Figure 3:
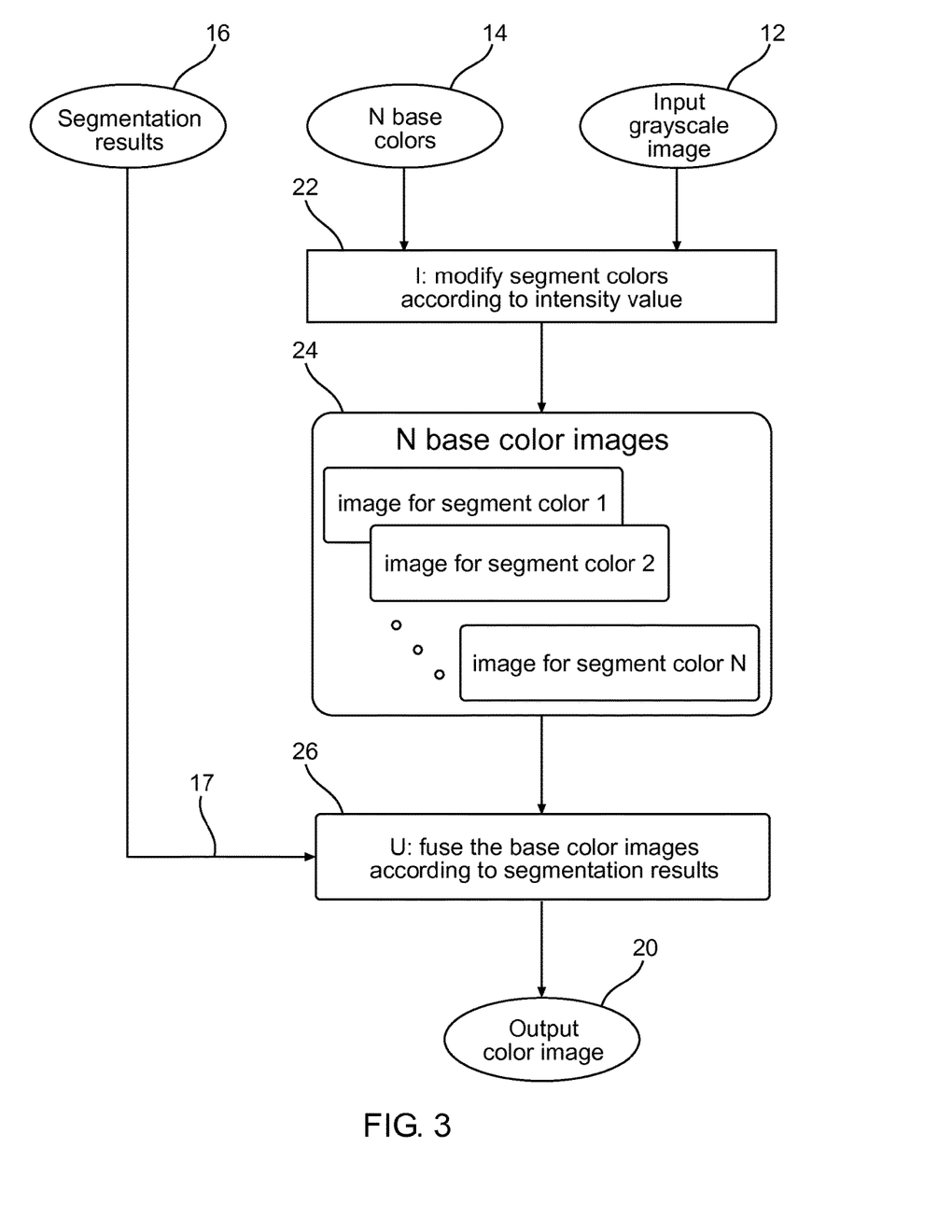
FIG. 3 schematically illustrates one version of the method shown in FIG. 2, involving the use of an intensity operator I and an uncertainty operator U, wherein the operator I is built based on intensity of the initial/input image, and the operator U is constructed based on the segmentation results.

FIG. 3 schematically illustrates a version 30 of the method shown in FIG. 2.

The version of FIG. 3 utilizes two operations by applying two respective mathematical operators generally marked as I and U:

Intensity operation/operator I is responsible for assigning color to reflect intensity of the input/initial image in the resulting/output color image 20.

Uncertainty operation/operator U is responsible for reflecting the information on segmentation uncertainty in the colors presented in the resulting/output image 20.

The flow chart of FIG. 3 schematically presents the version 30 of the proposed method.

The input data is illustrated by the blocks 12, 14, 16 similar to those in FIG. 2.

The block 16 provides information, for example in the form of an uncertainty vector V which comprises probability/uncertainty values of using various labels, out of N, for each pixel of the input image.

It should be noted that various methods may be used for collecting data and building vector V of uncertainty for each specific pixel of the initial image; such methods are out of the scope of the present application.

Block 22 indicates the operation performed by operator I, namely: modifying the selected N base colors according to intensity value of a specific pixel of the initial image.

The result of applying the operator I is shown in block 24, in the form of

N base-color images. Each of them is built for one base color and is pixel-wise modified by intensity of the initial image. In other words, each of these images is obtained upon application of the Intensity operator I to the grey-scale initial image, but with a different base color. As a result, the Intensity operator I modifies each of the N base colors so as to bring the N base color images—all having the intensity pattern similar to that of the initial image.

Intensity of the initial image may be determined/measured per pixel thereof, and the measured values of intensity may be then applied (for example, with a coefficient or a function) to the corresponding pixels of the N images.

In practice, it may be performed by changing the intensity attribute of the color depending on a selected color space: for example, V (value) in the HSV, L(luminosity) in the LAB, or all coordinates in the RGB or CMY triplets.

More specifically, the intensity attribute of the color may be multiplied by the intensity value of the corresponding pixel in the initial image (for example, by the grey level value of the pixel).

(Examples of applying the Intensity operator I in various color spaces will be shown below, in FIGS. 4 and 5.)

Actually, block 24 prepares, for each pixel of a future resulting image, N possible versions of labeling. These possible versions are presented by corresponding pixels of the N base color images.

Further, block 26 is designed for applying an uncertainty operator U to perform fusion of the N base color images according to the segmentation results forwarded to the block 26 along arrow 17. It should be done in a manner to finally obtain pixels of the resulting image (block 20). That manner should ensure that each pixel of the resulting image is wisely assigned a color which reflects both the intensity of the initial image and the uncertainty of segmentation results.

In a basic case, there is one-to-one correspondence between a set of pixels of the initial image and a set of pixels of the resulting color image.

Since N is the number of different labels used in the segmentation, N is natural $\geq 2$. It is understood for those skilled in the art, that the N different labels are intended for labeling different so-called segments formed from pixels of an image, wherein pixels of the same segment share similar properties.

In the proposed color coding procedure, the same number (N) of different base colors are respectively assigned to the N different labels.

As mentioned above, the segmentation results forwarded to block 26 may be presented in the form of an uncertainty vector V per pixel.

The uncertainty vector V may comprise one or more components which together indicate at least the following:

a label of the pixel (for example in the form of the segment color being one of the selected N base colors), and a value expressing uncertainty/probability of associating said label with said pixel.

In its generalized form, the vector V comprises N components respectively indicating N uncertainty values, each of the uncertainty values expressing probability ($P_i$) of associating one of the N labels with said pixel.

Vector V can be written down in a simplified form V1 as follows:

$$V1=(P1, P2, P3 \ldots Pi \ldots PN), \text{ wherein } 0 \leq Pi \leq 1$$

The vector V may be a so-called ordered vector, in which each of the N components implicitly (but unambiguously) indicates a specific one of the N labels.

In one exemplary case, only one of the N components of the vector has a non-zero value. If vector V is ordered, it is easy to determine to which label the component relates: only one specific label out of the N labels, corresponding to the position of the non-zero component in the vector V, will have the mentioned non-zero probability of being associated with the pixel, while other labels have zero probabilities and therefore cannot be associated with that pixel.

In another exemplary case, the uncertainty vector V comprises "n" non-zero components respectively corresponding to $1 \leq n \leq N$ labels, which will indicate that the pixel may be labelled by any of "n" different labels, with different probabilities.

The segmentation results may comprise additional, explicit information on labeling of the pixels, which would directly indicate specific possible labels (Li) for each specific pixel of the initial image (i.e., one or more of the N labels, having any probability to be appended to a specific pixel).

Similarly, the information on labeling per pixel may comprise indication of all the N labels, some of them, or just one single label out of N.

The explicit labeling information may be added to the uncertainty vector V in the form of additional components Li, and a resulting uncertainty vector may be written down in the form V2:

$$V2=(L1, L2, \ldots Li \ldots LN, P1, P2, \ldots Pi \ldots PN);$$

In the form V2 of the uncertainty vector V, the segmentation results per pixel may be presented by at least one pair of components, the pair comprising:

a label of the pixel (say, in the form of the segment color being one of the selected N base colors);

a value expressing uncertainty/probability of associating said label with said pixel.

It means that in the simplest example—when the segmentation results state that only one label can be applied to a specific pixel with a specific probability—vector V2 may comprise only two components.

It should be noted that the method of FIG. 3 may be performed in one and the same color space that serves both for applying the mathematical operator I (to present the selected N base colors), and for applying the mathematical operator U (to present colors modified by the color-coding procedure).

The mathematical operator U may utilize the uncertainty vector (V1 or V2) mentioned above. (i.e., information on the segmentation uncertainty concerning the labels and associated uncertainty values).

For example, U may be formed by applying a function F1 to the uncertainty vector V1 of the pixel:

$$U=F1(V1)=F1(P1, P2, \ldots Pi \ldots PN)$$

or, by applying a function F2 to the vector V2 of the pixel:

$$U=F2(V2)=F2(L1, L2, \ldots Li \ldots LN; P1, P2, \ldots Pi \ldots PN).$$

It should further be noted that different color spaces, different uncertainty vectors and different operators I and U may be used in the method. Some options of the proposed color-coding will be described in the following Figures.

Figure 4:
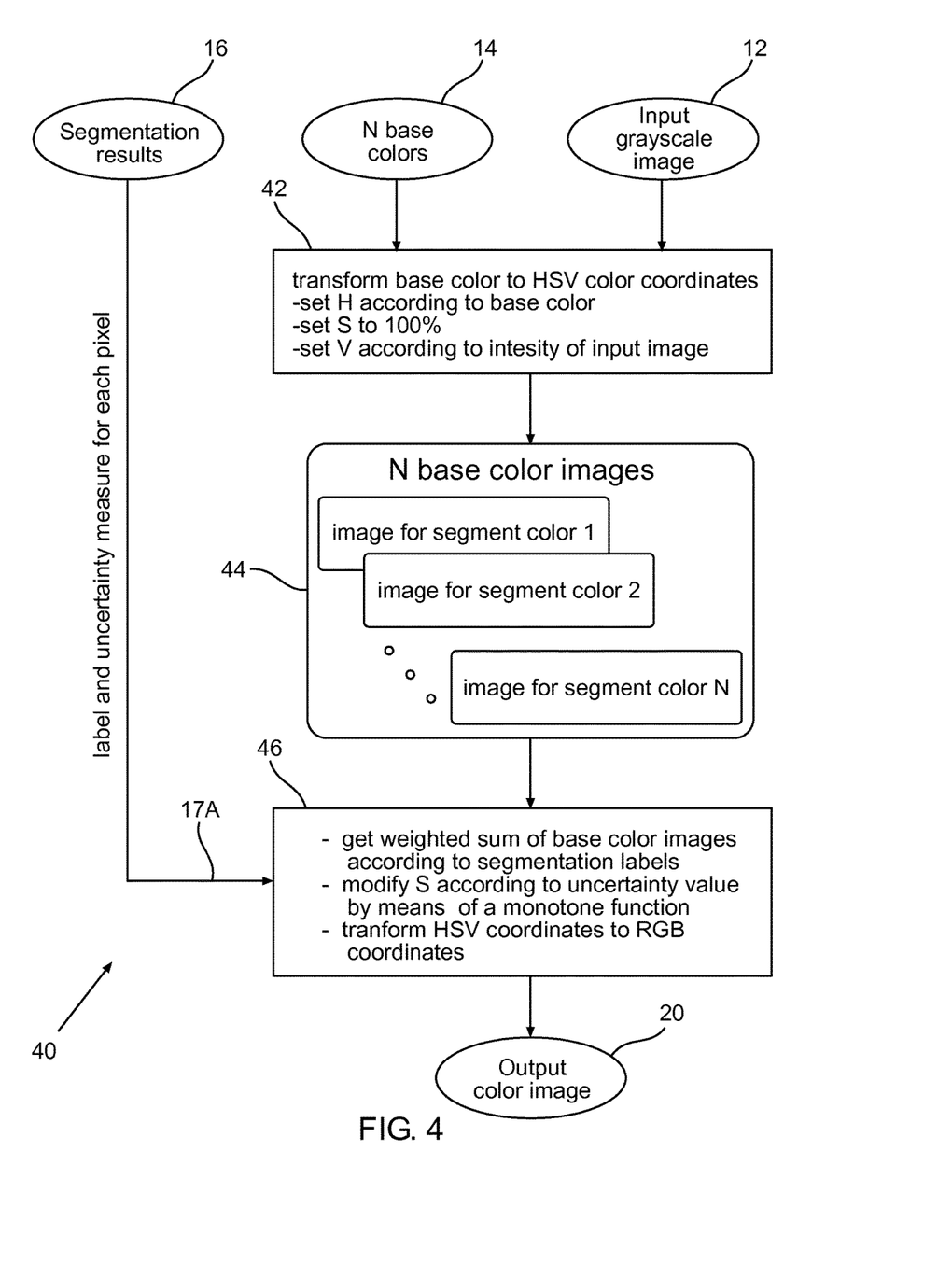
FIG. 4 schematically illustrates a more detailed version of the method shown in FIGS. 2 and 3, which comprises the use of two different color spaces (HSV and RGB) and utilizes the two operators I and U. In the version of FIG. 4, the segmentation results comprise, for each pixel of the image, a vector including a label appended to the pixel and a value characterizing uncertainty of that label for that pixel.

FIG. 4 shows an exemplary version 40 of the method, where two color spaces C(I) and C(U) are utilized.

In this version, the Intensity operator I is applied in block 42. It should be noted that, before applying the operator I, block 42 presents each of the N base colors in the HSV color space—we will call it a color space C(I).

Then, for each base color and for each pixel of the initial image, the following exemplary sub-operations of the operator I are performed in block 42: attribute H (Hue) of HSV is set according to a specific base color attribute S (Saturation) is set to 100% attribute V (Value) is set according to intensity of the pixel in the initial image.

As a result of applying the operator I in the color space HSV, N base color images are obtained (block 44). The N base color images of block 44 are similar to those of block 24 (FIG. 3), but may of course differ from them if any of the following parameters differ from those of FIG. 3: N base colors, the color space, intensity values of the initial image.

Let in FIG. 4, the Segmentation results 16 comprise per-pixel information about a specific label assigned to that pixel, plus information (measure, value) of uncertainty in assigning that label to that pixel.

Such information may be presented in the form of a per pixel vector V (for example, in the form V2) having only two non-zero components.

The vector V2 (17A) comprises for each specific pixel: a label assigned to the pixel and a scalar value being a measure of segmentation uncertainty for that pixel.

Then the segmentation results 16 (in the form of vector V2 marked with arrow 17A) are used to build, per each pixel of the initial image, an Uncertainty operator U.

For example, U may be like the one applied in block 46. In Block 46, the operator U is designed to perform the following sub-operations to create a resulting color at a pixel of the resulting image:

obtaining a weighted sum of base color images according to segmentation labels (in our case only one label is indicated in V2, so only one base color image will participate in the sum)

modifying attribute S of the pixel according to the scalar value of uncertainty, by means of some pre-selected monotone function thereby receiving coordinates of the resulting color in the HSV color space (which serves the C(U);

transforming the HSV coordinates of the resulting color into RGB coordinates of that color (where RGB is an additional, representing color space).
Block 20 thus represents the complete resulting image in the RGB coordinates.

In other words, upon applying the operator U in block 46, the output color image 20 is finally obtained, in which each specific pixel has color which is calculated for that pixel using the following data: intensity of the initial image, a specific base color corresponding to the label assigned to that pixel, a scalar value of uncertainty of labeling (segmentation) for that pixel. It may be a mixed color, a color having specific saturation, etc. depending on the selected operator I and its color space, and a specific expression of the U-operator (and its color space). In any case, the resulting color of the pixel will demonstrate the probability of the pixel's belonging to the label assigned to it.

Figure 5:
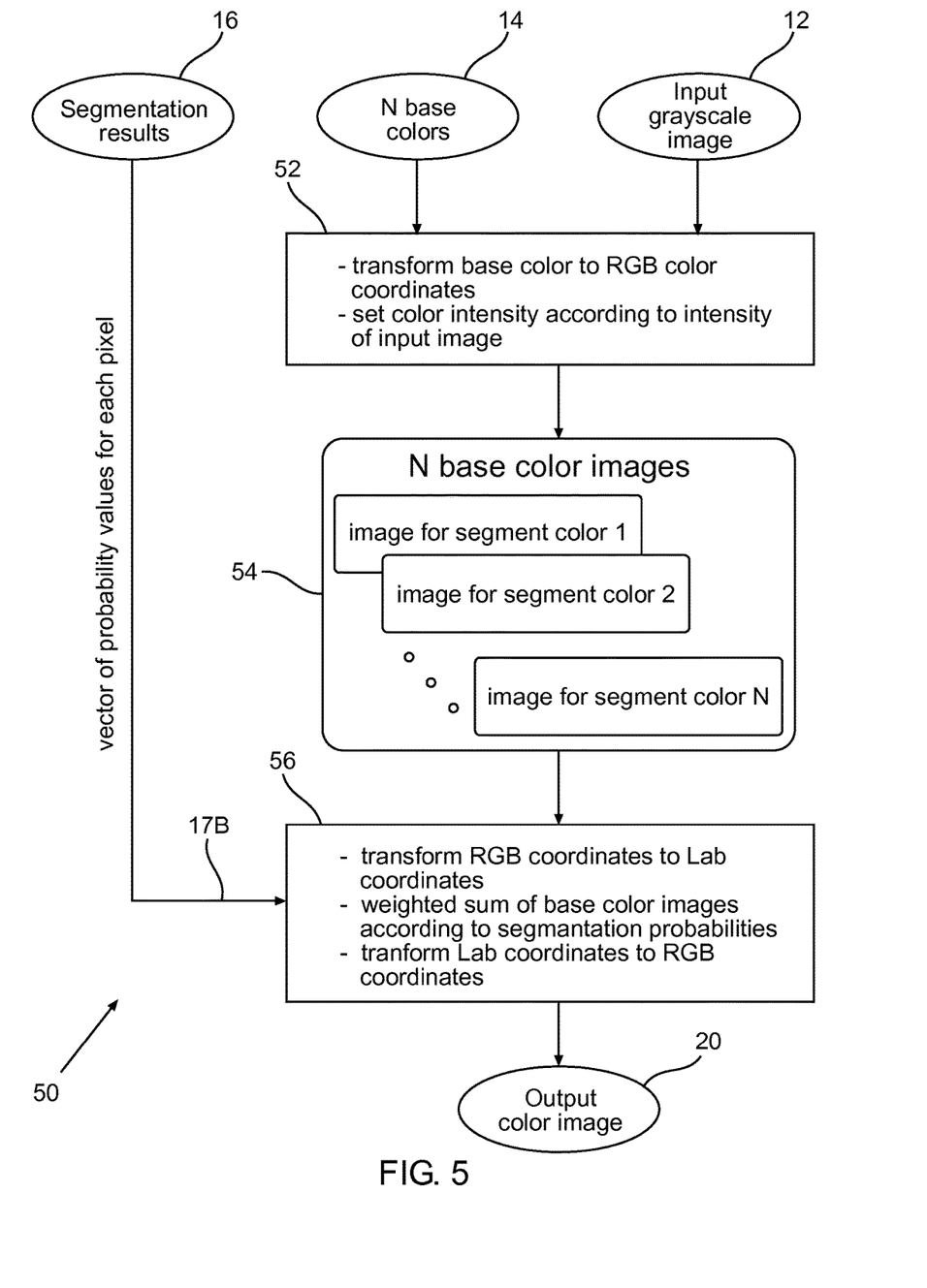
FIG. 5 schematically illustrates yet a further version of the methods shown in FIGS. 2 and 3, with utilizing the two operators I and U and with involving three color spaces in sequence (RGB→Lab→RGB). In the version of FIG. 5, the segmentation results comprise, for each pixel of the image, a vector of multiple probability/uncertainty values of appending different labels to the pixel.

FIG. 5 shows a schematic flow-chart of version 50 of the method, being slightly different from version 40 illustrated in FIG. 4.

The difference will be a) in the color spaces that were used for I and U, b) in the form of the vector presenting the Segmentation results and c) the Uncertainty operator U.

In version 50, the Segmentation results can be presented in the form of a per pixel uncertainty vector V (for example, in the form V1, marked 17B), i.e. the vector having N uncertainty values, wherein each uncertainty value of the vector reflects probability of applying one of N labels (i.e., a specific base color out of N base colors) to that specific pixel.

In version 50, the uncertainty operator U is then built based on the uncertainty vector V1.

In version 50 of the method, the base colors are represented in RGB (Red-Green-Blue) color space and then modified by the Intensity operator I (block 52). The RGB color space will be called C(I). The Intensity operator of this example works as follows: the base colors are pixel-wise modified in RGB by setting intensity of the base colors according to intensity of the initial image (input grey image 12). In other words, we obtain N base color images being such, that corresponding pixels of the N base color images and the initial image have the same or a proportional intensity value (for example, by providing the same or proportional values simultaneously to all R, G, and B attributes of the color of a pixel in a base color image).

As a result, N base color images are obtained, which are schematically shown in Block 54. As agreed before, the method can be performed with at least two labels (i.e., at least two base colors, N natural, ≥2). In version 50, block 54 schematically shows images each supposed to have one of the selected base colors (1, 2, . . . N), which is modified by intensity of the initial image. Block 56 is responsible for:

transforming the color coordinates of all pixels of the N color images obtained at block 54, into coordinates of another color space C (U) (in this case, C(U)=Lab). This operation does not change the color of the images, but it presents the colors in a different color space for further processing;

applying the Uncertainty operator U to the N base color images so as to obtain a weighted sum of the N base color images according to the segmentation probabilities.

In other words, each specific pixel of the future output image will acquire a color modified by the combination of N probabilities in respect of N base colors, as stated by operator U with respect to that specific pixel.

transforming the Lab coordinates of the obtained colors in to RGB coordinates (for representation only).

Upon performing the operations of block 56, the output color image 20 is finally obtained, in which each pixel has acquired the color which is affected both by intensity of the initial image and by the segmentation uncertainty (vector) of the pixel. The resulting color may be a mixed color, a color having specific saturation, etc. depending on the selected operator I, its color space, and on a specific expression of the U-operator and its color space. Anyway, the resulting color of the pixel will demonstrate the probabilities of the pixel's assignment to the N labels (base colors). The resulting (output) color image will thus be built from pixels, each reflecting (by its modified color) both intensity of the initial image, and the uncertainty of the pixel's segmentation.

Embodiments of the invention may also be implemented in a computer program product for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program product is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program product may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

According to a further feature of an embodiment of the present invention, a computer program product for visualizing elements in images by applying color coding is disclosed. It should be understood that each block of the flowchart illustrations and/or block diagrams, and combinations of blocks in the flowchart illustrations and/or block diagrams, can be implemented by computer program instructions. These computer program instructions may be provided to a processor (as described as part of FIG. 1) for implementing the functions specified in the flowcharts (shown in FIGS. 3, 4, and 5) and block diagrams (shown in FIGS. 1 and 2).

The computer program instructions may also be stored in a computer readable medium that can direct a computer or other systems to function in a particular manner, such that the instructions stored in the computer readable medium produce an article of manufacture including instructions which implement the function specified in the flowcharts and block diagrams.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While a number of exemplary aspects and embodiments have been discussed above, those of skill in the art will recognize certain modifications, permutations, additions and sub combinations thereof. It is therefore intended that the following appended claims and claims hereafter introduced be interpreted to include all such modifications, permutations, additions and sub-combinations as are within their true spirit and scope.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description. While preferred embodiments of the present invention have been shown and described, it should be understood that various alternatives, substitutions, and equivalents can be used, and the present invention should only be limited by the claims and equivalents thereof.

The invention claimed is:

1. A method for visualizing elements in images by applying a color-coding procedure to data, wherein the data comprises:
   an initial image; and
   results of segmentation performed using N labels, where N is an integer value greater than or equal to two, wherein the segmentation results correspond to the initial image and comprise information on segmentation uncertainty;
   wherein the color-coding procedure comprises constructing a resulting colored image based on the initial image and N pre-selected base colors respectively assigned to the N labels, while modifying colors in the resulting colored image by using intensity of the initial image and the information on segmentation uncertainty, wherein one or more pixels in the resulting colored image has a color that is based on a combination of an intensity of a corresponding one or more pixels in the initial image and the segmentation results of the corresponding one or more pixels in the initial image.

2. The method according to claim 1, wherein the initial image is a SEM-image of a semiconductor multilayer structure, and wherein N is less than or equal to a number of layers in the semiconductor multilayer structure.

3. The method according to claim 1, wherein modifying the colors in the resulting colored image is performed by creating gradual changes of the base colors.

4. The method according to claim 1, wherein the segmentation results include information on labeling of each specific pixel of the initial image and the information on segmentation uncertainty of each specific pixel of the initial image.

5. The method according to claim 1, further comprising:
   producing the resulting colored image by performing the color-coding procedure, in which color of any pixel of the resulting colored image is calculated using:
   said N base colors,
   the information on segmentation uncertainty of the corresponding pixel of the initial image, and
   an intensity value of the corresponding pixel in the initial image.

6. The method according to claim 1, wherein the color-coding procedure utilizes two mathematical operators comprising:
   a pixel-wise intensity operator I, for participation in calculating a color of a pixel of the resulting image, by using intensity of a corresponding pixel of the initial image, and
   a pixel-wise uncertainty operator U, for participation in calculating a color of a pixel of the resulting image, using the segmentation results for a corresponding pixel of the initial image.

7. The method according to claim 6, further comprising:
   applying the operator I for modifying each of the selected N base colors according to intensity of the initial image, thereby creating N base color images of the initial image; and
   applying the operator U to the N base color images for combining the images according to the segmentation results for obtaining the resulting colored image.

8. The method according to claim 7, further comprising:
   applying the intensity operator I in a color space HSV thus forming said N base color images by setting a per-pixel attribute V of said HSV at each of the N base color images according to per-pixel intensity in the initial image; and
   applying the uncertainty operator U to the N base color images, wherein the operator U is applied per pixel in the color space HSV and:
   takes into account the segmentation results indicating a label and a corresponding segmentation uncertainty value per pixel,
   provides a weighted sum of the N base color images, according to the indicated label, and
   modifies the attribute S of said HSV, according to the indicated segmentation uncertainty.

9. The method according to claim 7, further comprising:
   applying the intensity operator I in a color space RGB thus forming said N base color images such that, in each of the N base color images, values of color attributes R,G,B per pixel correspond to per-pixel intensity in the initial image; and
   applying the uncertainty operator U to the N base color images in a color space Lab, wherein the operator U is applied per pixel by:
   transforming color coordinates of the N color images into coordinates of the color space Lab;
   taking into account the segmentation results indicating more than one labels with corresponding segmentation uncertainty values per pixel, and
   obtaining a weighted sum of the N base color images in the color space Lab according to the segmentation uncertainty values.

10. The method according to claim 1, wherein the color-coding procedure is performed using one or more color spaces.

11. A system for visualizing elements in images by color-coding, the system comprising:
a processor; and
a memory, operatively coupled to the processor, for storing data comprising:
an initial image,
results of segmentation related to the initial image, based on N labels and comprising information on segmentation uncertainty, wherein N is an integer value greater than or equal to two; and
N pre-selected base colors respectively assigned to the N labels;
wherein the processor and the memory accommodate at least one color-coding software block designed for applying a color-coding procedure to the initial image to construct a resulting colored image based on the initial image and the pre-selected N base colors, while modifying colors in the resulting colored image by using intensity of the initial image and the information on segmentation uncertainty wherein one or more pixels in the resulting colored image has a color that is based on a combination of an intensity of a corresponding one or more pixels in the initial image and the segmentation results of the corresponding one or more pixels in the initial image.

12. A non-transitory storage medium comprising computer implementable instructions for carrying out a method comprising:
receiving data comprising an initial image and results of segmentation performed using N labels, where N is an integer value greater than or equal to two, wherein the segmentation results correspond to the initial image and comprise information on segmentation uncertainty; and
applying a color-coding procedure to the data, wherein applying the color-coding procedure comprises constructing a resulting colored image based on the initial image and N pre-selected base colors respectively assigned to the N labels, while modifying colors in the resulting colored image by using intensity of the initial image and the information on segmentation uncertainty, wherein one or more pixels in the resulting colored image has a color that is based on a combination of an intensity of a corresponding one or more pixels in the initial image and the segmentation results of the corresponding one or more pixels in the initial image.

13. The non-transitory storage medium according to claim 12, wherein the initial image is a SEM-image of a semiconductor multilayer structure, and wherein N is less than or equal to a number of layers in the semiconductor multilayer structure.

14. The non-transitory storage medium according to claim 12, wherein modifying the colors in the resulting colored image is performed by creating gradual changes of the base colors.

15. The non-transitory storage medium according to claim 12, wherein the segmentation results include information on labeling of each specific pixel of the initial image and the information on segmentation uncertainty of each specific pixel of the initial image.

16. The non-transitory storage medium according to claim 12, the method further comprising:
producing the resulting colored image by performing the color-coding procedure, in which color of any pixel of the resulting colored image is calculated using:
said N base colors,
the information on segmentation uncertainty of the corresponding pixel of the initial image, and
an intensity value of the corresponding pixel in the initial image.

17. The non-transitory storage medium according to claim 12, wherein the color-coding procedure utilizes two mathematical operators comprising:
a pixel-wise intensity operator I, for participation in calculating a color of a pixel of the resulting image, by using intensity of a corresponding pixel of the initial image, and
a pixel-wise uncertainty operator U, for participation in calculating a color of a pixel of the resulting image, using the segmentation results for a corresponding pixel of the initial image.

18. The non-transitory storage medium according to claim 17, the method further comprising:
applying the operator I for modifying each of the selected N base colors according to intensity of the initial image, thereby creating N base color images of the initial image; and
applying the operator U to the N base color images for combining the images according to the segmentation results for obtaining the resulting colored image.

19. The non-transitory storage medium according to claim 18, the method further comprising:
applying the intensity operator I in a color space HSV thus forming said N base color images by setting a per-pixel attribute V of said HSV at each of the N base color images according to per-pixel intensity in the initial image; and
applying the uncertainty operator U to the N base color images, wherein the operator U is applied per pixel in the color space HSV and:
takes into account the segmentation results indicating a label and a corresponding segmentation uncertainty value per pixel,
provides a weighted sum of the N base color images, according to the indicated label, and
modifies the attribute S of said HSV, according to the indicated segmentation uncertainty.

20. The non-transitory storage medium according to claim 12, wherein the color-coding procedure is performed using one or more color spaces.

* * * * *